United States Patent [19]
Goldman

[11] 4,139,949
[45] Feb. 20, 1979

[54] COMPASS HAVING A FIBER OPTIC OUTPUT

[76] Inventor: Abraham Goldman, 105-54 Avenue K, Brooklyn, N.Y. 11236

[21] Appl. No.: 815,462

[22] Filed: Jul. 13, 1977

[51] Int. Cl.² .............................................. G01C 17/24
[52] U.S. Cl. .................................. 33/348; 33/355 R; 116/DIG. 26; 350/96.24
[58] Field of Search ................. 33/348, 361, 355, 356, 33/357, 358, 359; 116/DIG. 26; 350/96 B

[56] References Cited
U.S. PATENT DOCUMENTS

| | | | |
|---|---|---|---|
| 3,349,406 | 10/1967 | Perry et al. | 350/96 B |
| 3,677,619 | 7/1972 | MacKenzie | 116/DIG. 26 |
| 3,905,121 | 9/1975 | Takeda et al. | 33/361 |

*Primary Examiner*—William D. Martin, Jr.
*Attorney, Agent, or Firm*—Ladas, Parry, Von Gehr, Goldsmith & Deschamps

[57] ABSTRACT

A compass having a magnetic element pivotally mounted in a housing, the housing including a light source and one end of an array of fiber optic bundles and the element carrying a reflector and/or an aperture to selectively permit light from the source to reach a selected one or more of the fiber optic bundle ends within the housing in dependence upon the orientation of the element relative to the housing about the pivot axis of the pivotal mounting.

5 Claims, 5 Drawing Figures

U.S. Patent Feb. 20, 1979 Sheet 1 of 2 4,139,949
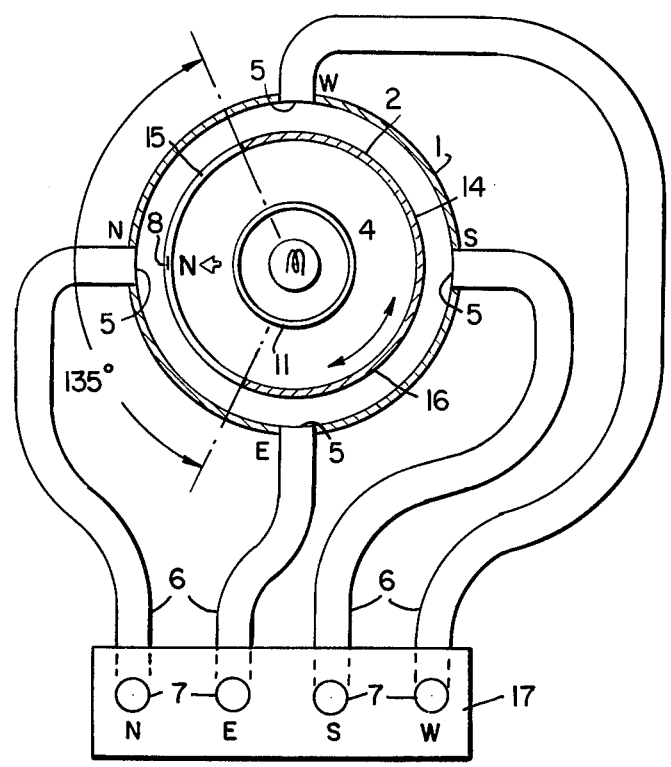
FIG. 1
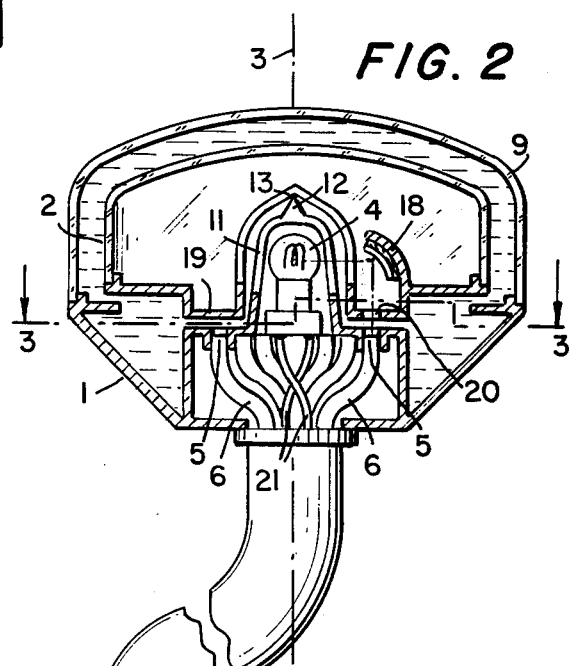
FIG. 2
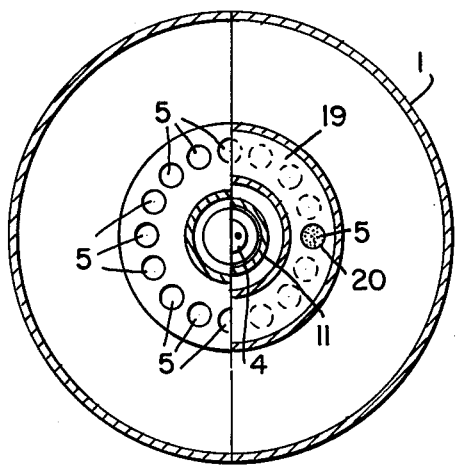
FIG. 3
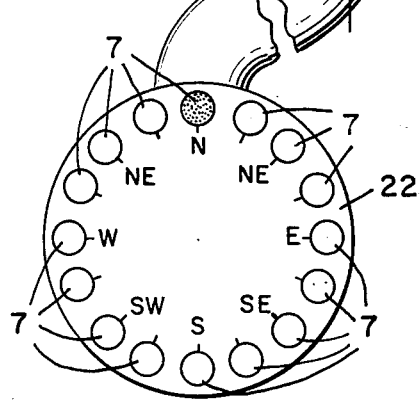

COMPASS HAVING A FIBER OPTIC OUTPUT

The present invention relates to a compass having a fiber optic output.

U.S. Pat. No. 2,286,014 proposes an instrument in which an aircraft angle indication is provided by light passing through a bubble in a two dimensional horizontal spirit level, for transmission through "Lucite" rods to a vertical display. In this arrangement the rods are arranged in a pattern to be selectively illuminated by the light passing through the bubble in dependence upon the angle of the spirit level portion of the instrument relative to a horizontal plane. This instrument does not provide a remote-read out and apart from a bubble in fluid has no moving parts.

It is an object of the present invention to provide a remote read-out capability for a magnetic compass utilizing the light transmission capabilities of fiber optic bundles without encumbering the free pivotal movement of a magnetic north seeking element relative to a housing. The present invention provides a solution which is versatile, effective and capable of manufacture at an economic price.

According to the present invention there is provided a compass having a fiber optic output comprising: a housing defining a vertical pivot axis; a magnetic north seeking element pivotally mounted to said housing for rotation relative to said housing about said vertical axis; a plurality of fiber optic bundles each having an input end supported by said housing and an output end remote from said housing, said input ends being supported by said housng in an array disposed about said vertical axis; and a light source disposed in said housing; said element having means to cause light from said source to reach a desired one or more of said input ends in dependence upon the orientation of said element about said vertical axis relative to said housing, the number of said input ends simultaneously receiving light being less than said plurality.

The remote output of the compass of the present invention may be used to provide a visual display or as an input to control apparatus (for example, an automatic steering controller) having light sensing input means responsive to the selective illumination provided by the output of the fiber optic bundles.

The invention will now be described, by way of example, with reference to the accompanying drawings, in which:

FIG. 1 is a diagrammatic plan view of one form of the invention illustrating the basic concept;

FIG. 2 is a diagrammatic sectional elevation of a second form of the invention shown attached to a circular remote read out;

FIG. 3 is a diagrammatic section along section line 3—3 shown in FIG. 2;

Figure 4:
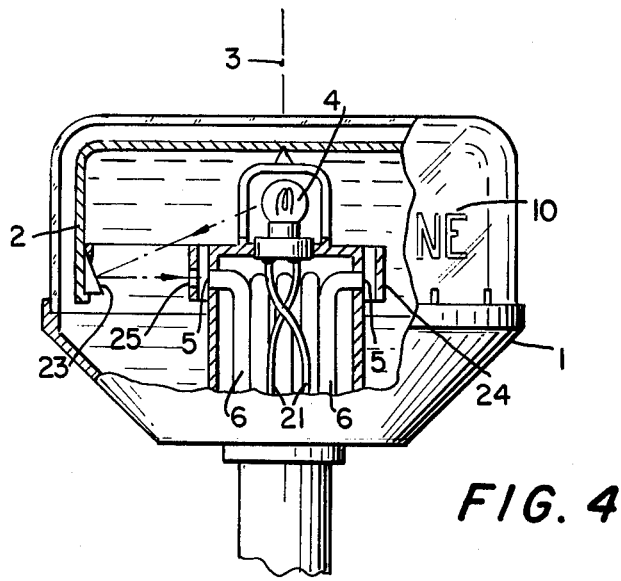
FIG. 4 is a diagrammatic partially sectioned elevation of a third form of the invention.

The basic components of a compass according to the present invention are a housing 1 of generally circular configuration, in plan, in which a magnetic north seeking element 2 is pivotally mounted for free rotation about a vertical axis 3 relative to the housing 1 with the element 2 including means for causing light from a source 4, supported centrally in said housing 1, to reach a desired one or more of the input ends 5 of a plurality of fiber optic bundles 6 for transmission to output ends 7 of the fiber optic bundles for use, in the forms of the invention illustrated, to provide a remote visual read-out of the orientation of the housing 1 about the vertical axis 3 relative to the element 2.

The element 2 is magnetized to have magnetic poles the positioning of which will cause the element always to seek a particular orientation about the vertical axis 3 relative to magnetic north. As shown in FIG. 1 portion 8 of the periphery of the element 2 will always tend to face magnetic north.

As illustrated in FIGS. 2 and 4 the housing 1 includes a transparent dome top 9 through which direction indicating indicia 10 may be observed in order to ascertain the orientation of the housing 1 relative to the element 2 about the vertical axis 3. The light source 4 is centrally supported in the housing 1 and is protected by a transparent cover 11 which in combination with transparent portions of the element 2 permits light from the source 4 to be utilized to illuminate the direction indicating indicia 10. Also, as illustrated in FIGS. 2 and 4, the transparent cover 11 carries a pivot point 12 upon which a pivot bearing 13 of element 2 is mounted to permit free pivotal rotation of said element 2 relative to said housing 1 about said vertical axis 3.

With particular reference to FIG. 1, the input ends 5 are equi-angularly disposed on a circle centered upon the vertical axis and lying in a plane normal to the vertical axis. The input ends 5 are supported by the outer periphery of the housing 1 in orientations by virtue of which all input ends face radially inwardly toward the vertical axis. The means for controlling passage of light from the source 4 to the input ends 5 is an annular flange 14 centered on the vertical axis between the light source 4 and the inwardly facing input ends 5. In this example, four fiber optic bundles 6 are utilized to correspond to the four cardinal points of the compass (north, east, south and west) and the annular flange 14 consists of a transparent circumferentially extending part 15 subtending an angle of 135° about the vertical axis 3 and centered at peripheral portion 8. The remainder of the circumference of the annular flange 14 is opaque. The output ends 7 are disposed in a visual read-out indicator 17 which may be remotely located relative to the housing 1. Typically the housing 1 is mounted on the exterior of the vehicle away from metallic parts of the vehicle which might interfere with the magnetic north seeking characteristic of element 2, while the indicator 17 is disposed in a convenient place in or on the vehicle for desired read-out of directional information. As the vehicle carrying the compass changes direction relative to magnetic north the element 2 will rotate about vertical axis 3 to maintain its orientation relative to magnetic north and the light emitted by light source 4 will pass through the transparent part 15 to illuminate the input ends 5 or one or two of the fiber optic bundles 6 in dependence upon the orientation of the housing 1 relative to element 2 about the vertical axis 3. For example, when the vehicle and housing 1 are directed at magnetic north the element 2 and housing 1 will be oriented as shown in FIG. 1 and only the output 7 associated with that bundle will be illuminated. In a direction intermediate the four cardinal compass points, two adjacent input ends 5 may be illuminated, for example, when the orientation of the body is to the northwest relative to magnetic north, the input ends 5 of the fiber optic bundles 6 associated with north and west will receive light from source 4 by way of the transparent part 15.

It will be appreciated that the transparent part 15 may be, for example, a gap, a portion of transparent material or a lens for concentrating light at the input ends 5.

In the embodiment shown in FIGS. 2 and 3 the means for controlling transmission of light from source 4 to the input ends 5 is a concave mirror, supported by the element 2 for rotation therewith about the vertical axis 3, in combination with an opaque annular flange 19 having a light transmitting port 20 disposed to transmit light reflected by the concave mirror 18 to desired input ends 5 of fiber optic bundles 6. The input ends 5 in this embodiment are disposed on a circle, centered on the vertical axis 3 and lying in a plane normal to the vertical axis, with the input ends oriented to receive light from a direction generally parallel to the vertical axis. Sixteen fiber optic bundles are utilized in this in this embodiment with the input ends 5 evenly disposed on said circle in closely spaced relationship. The housing 1, including the transparent cover 11, is sealed to permit the presence of element damping and lubricating fluid therein.

Light from the centrally located source 4, which is supplied with electrical power by way of input conductors 21, passes through the transparent cover 11 and a transparent portion of the support structure for pivot bearing 13 to be reflected by the concave mirror 18 to a direction generally parallel with the vertical axis 3 toward the input ends 5. This reflected light is transmitted through port 20 to illuminate one or more adjacent input ends 5 in dependence upon the orientation of housing 1 relative to element 2 about the vertical axis 3. As shown only a single input end 5 is being illuminated.

It will be appreciated that the concave mirror 18 may have a geometry which concentrates the reflected light into a beam of cross section to illuminate only the desired one or more adjacent input ends 5 and that in such an arrangement the control of the light by port 20 would be unnecessary and the opaque annular flange 19 might be eliminated. It will also be appreciated that the relative complexity of a concave mirror might be avoided in favor of a simple construction involving a simple flat reflective surface or the provision of a highly reflective surface on the interior of the element to provide sufficient randomly reflected light to ensure the desired illumination of the one or adjacent input ends 5 through the port 20.

As illustrated in FIG. 2, the 16 fiber optic bundles 6 exit centrally at the bottom of the housing 1, together with the conductors 21. The 16 fiber optic bundles have output ends 7 connected in a read-out display 22 to form a circular array to indicate 16 points of a compass to provide a visual indication of the orientation of element 2 relative to housing 1 about axis 3. In the arrangement illustrated the output end 7 associated with magnetic north is illuminated. It will be appreciated that although arrangements having four or sixteen fiber optic bundles have been disclosed herein, any number of such bundles which can be conveniently housed and disposed in the compass could be utilized. It will also be appreciated that the output ends of the fiber optic bundles may be provided with light concentrating lenses to provide a more brilliant though smaller direction indicating output.

The embodiment illustrated in FIG. 4 differs from that of FIGS. 2 and 3 primarily by the positioning of the input ends 5 to face radially outwardly from a central location in the housing and by the provision of a reflector 23 supported adjacent the outer periphery of element 2 to reflect light from centrally located source 4 radially inwardly toward the input ends 5. In this embodiment a longitudinally extending annular flange 24 opaque to light is supported around the circle of input ends 5 between the input ends 5 and the reflector 23. This annular flange has a port 25 to permit passage of light reflected by reflector 23 to a desired one or a plurality of adjacent input ends 5 selected in dependence upon the orientation of the element 2 relative to housing 1 about axis 3.

Figure 5:
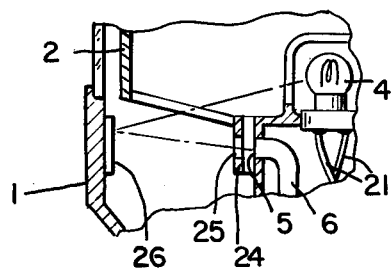
FIG. 5 is a fragmentary section or elevation of an alternative form of the arrangement shown in FIG. 4.

In the alternative construction of FIG. 4 embodiment as illustrated in FIG. 5 the reflector 23 is replaced by an annular reflector 26 extending around the entire inner periphery of the exterior of housing 1 to reflect light from source 4 inwardly toward the input ends 5 for selective illumination thereof under the control of port 25 in opaque annular flange 24.

While the compass of the present invention has been particularly described in circumstances in which a visual read-out of direction is provided, it will be appreciated that the directional information transmitted by the fiber optic bundles may be used to activate light sensitive input means of a control apparatus, for example, an automatic steering controller of a boat.

It will also be appreciated that while the invention has been discussed in the context of illuminating one or an adjacent plurality of input ends of fiber optic bundles, the invention is equally applicable to arrangements in which a plurality of input ends which are not necessarily adjacent to one another is illuminated to provide the directional information, for example the input ends of fiber optic bundles disposed 180° apart may be illuminated.

It will be further appreciated that while directional information has been described with reference to illumination of input ends of fiber optic bundles to provide this information the inventive concept is also applicable to an arrangement in which only the one or the plurality of adjacent input ends associated with the desired directional information is excluded from illumination whereby a visual display would have all output ends of the fiber optic bundles illuminated except for those providing the directional information.

I claim:

1. A compass having a fiber optic output comprising:
    a housing defining a vertical pivot axis;
    a magnetic north seeking element pivotally mounted to said housing for rotation relative to said housing about said vertical axis;
    a plurality of fiber optic bundles each having an input end supported by said housing and an output end remote from said housing, said input ends being supported by said housing in an array disposed about said vertical axis; and
    a light source disposed in said housing for continuosly emitting light;
    said element having means to cause light from said source to reach a desired one or more of said input ends in dependence upon the orientation of said element about said vertical axis relative to said housing, the number of said input ends simultaneously receiving light being less than said plurality, thereby continuously to produce a direct reading visual analog indication of direction at said fiber optic output, wherein said input ends are arranged evenly spaced in a circle centered on and lying in a plane normal to said vertical axis, said input ends are oriented to receive light from a direction generally parallel to said vertical axis, said light source is centrally disposed in said housing on said vertical axis and said means includes a reflector for reflecting light from said source toward said input ends in a direction generally parallel to said vertical axis and an annular flange portion of opaque nature with a light transmitting portion disposed to transmit the light reflected by said reflector to the desired one or more said input ends in dependence upon the orientation of said element about said vertical axis relative to said housing.

2. A compass according to claim 1, wherein said reflector is concave and said input ends are evenly disposed in said circle and closely adjacent one another peripherally.

3. A compass having a fiber optic output comprising:
a housing defining a vertical pivot axis;
a magnetic north seeking element pivotally mounted to said housing for rotation relative to said housing about said vertical axis;
a plurality of fiber optic bundles each having an input end supported by said housing and an output end remote from said housing, said input ends being supported by said housing in an array disposed about said vertical axis; and
a light source disposed in said housing for continuously emitting light;
said element having means to cause light from said source to reach a desired one or more of said input ends in dependence upon the orientation of said element about said vertical axis relative to said housing, the number of said input ends simultaneously receiving light being less than said plurality, thereby continuously to produce a direct reading visual analog indication of direction at said fiber optic output, wherein said input ends are arranged evenly spaced in a circle centered on and lying in a plane normal to said vertical axis, said input ends face radially outwardly from said vertical axis, said light source is located on said vertical axis in said housing, a reflector is located to receive light from said light source and to reflect this light radially inwardly toward said input ends and said means includes an annular portion disposed between said reflector and said input ends wherein said annular portion is adapted for transmission of light through a part of its circumference, the remainder of the circumference being opaque, whereby light reflected by said reflector will illuminate said desired one or more of said input ends in dependence upon the orientation of said element about said vertical axis relative to said housing.

4. A compass according to claim 3, wherein said reflector is a part of said means and is supported by said element adjacent the periphery of the element.

5. A compass according to claim 3, wherein said reflector is an annular reflector centered on said vertical axis and supported by said housing.

* * * * *